Patented Mar. 16, 1943

2,314,307

UNITED STATES PATENT OFFICE 2,314,307

PRINTING INK

Carleton Ellis, Montclair, N. J.; Carleton Ellis, Jr., Bertram Ellis, and Bank of Montclair, executors of said Carleton Ellis, deceased, assignors to Ellis Laboratories, Inc., a corporation of New Jersey No Drawing. Application May 21, 1940, Serial No. 336,357

3 Claims. (Cl. 260—37)

This invention relates to printing inks which are solids at atmospheric temperature and molten when warmed.

One object of this invention is to furnish printing inks which are solids at atmospheric temperature, but readily flowable when warmed.

A further object of this invention is to furnish printing inks which can be used to print while warm, and which become solid on cooling to room temperature.

A still further object of this invention is to provide a quick-setting printing ink which contains as binding ingredients only those which are solid at atmospheric temperature and which become molten on warming.

Still further objects of this invention will be apparent from the following description of my invention.

Many types of inks have been proposed to secure quick-drying of the ink when it is applied to the paper to be printed. For example, inks have been proposed which dry by absorption of the vehicle into the fibers of the paper. Such inks which usually are termed "mineral-oil inks," have been utilized generally for newspaper printing. However, because the inks must be absorbed by the paper in order to secure substantially dry prints in relatively short periods after printing, such inks are applicable only to non-coated, rough-surfaced paper.

Also, it has been proposed to accelerate hardening of inks which contain drying oils such as linseed oil by accelerating the oxidation or polymerization of the drying oil. Thus, many methods for ozonation of drying-oil films have been proposed. However, such methods require installation of cumbersome apparatus and, in many cases, are attended by hazards such as increase of static electricity in the vicinity of the press.

One of the most common methods of producing quick-drying printing inks involves the evaporation of a solvent from the composition after the print has been made. This method also requires the installation of expensive solvent-recovery systems near the press, and also is attended by distinct fire and health risks.

I have found a much simpler and more economical method of securing quick-setting of printing inks. This method comprises utilization of a printing ink which is solid at atmospheric temperature but which is molten when heated. Such an ink is preferably printed on a press which has a heated ink fountain, distributing rollers, and type bed. In this way, the ink is fluid when printed. After the printing operation, the ink dries simply by returning to its natural solid state on cooling to atmospheric temperature. In this manner, an almost instantaneous setting of the ink on the paper is secured subsequent to the printing operation. Offsetting of the ink from a printed surface is eliminated, and as a result, the speed with which the printing operations may be effected is limited only by the speed of the printing press used in the printing operation with inks of my invention.

The principal component of the inks of my invention is a thermoplastic resin which is a solid at atmospheric temperature and which is molten when warmed. Preferably, as thermoplastic resin I employ resins secured by the interaction of phenol and its homologues with sulfur monochloride. Such resins are solids at atmospheric temperature, so that they serve as binding agents for the pigments and other ingredients of my inks subsequent to the printing operation. Further, the resins secured by interaction of phenol and its homologues with sulfur monochloride are molten when warm, so that during the printing operation they serve as vehicles for the pigments and other ingredients of inks of my invention.

As coloring agent for the inks of my invention, almost any pigment may be employed. Thus, vermilion, cadmium red, molybdate orange, iron oxide reds, cadmium yellow, chrome yellow, zinc yellow, iron yellow, ochres, iron blue, ultramarine blue, chrome green, emerald green, titanium dioxide, lithopone, white lead, zinc white may be employed, as well as laked dyestuffs or pigment dyestuffs.

Other modifying agents such as wool fat, natural or synthetic waxes, plasticizing agents or the like may be incorporated in inks of my invention. However, it should be emphasized that any such added materials do not affect the outstanding characteristics of my inks which are secured by utilization of thermoplastic resins secured by interaction of phenol and its homologues with sulfur monochloride, namely, that the inks of my invention are solid at room temperature but are molten when warmed.

The following examples illustrate more clearly my invention, though they are merely illustrative.

*Example 1.*—Thirty parts of phenol were dissolved in an equal quantity of benzene. The solution then was stirred at room temperature and a mixture of 25 parts of sulfur monochloride in 35 parts of benzene added slowly over a period of 1.5 hours. The solid reaction product which formed was removed from the reaction chamber and washed well with water. That portion insoluble in water was extracted with acetone, and any acetone-insoluble material separated. The acetone extract then was evaporated and an amber-colored resin secured as residue. This resin was a solid at atmospheric temperature, but molten when warmed, that is, it was thermoplastic.

*Example 2.*—An ink was prepared by admixing 10 parts of carbon black with 90 parts of the resin secured as described in Example 1. The ink was solid at atmospheric temperature, but molten when warmed. On printing with this ink at approximately 80° C. (176° F.), glossy, flexible, non-smudging prints were secured which dried instantaneously when the printed paper was removed from the press.

*Example 3.*—One hundred twenty parts of phenol were dissolved in 150 parts of benzene. The solution was stirred, and a mixture of 100 parts of sulfur monochloride in 140 parts of benzene added slowly to the solution of phenol in benzene at atmospheric temperature. The solid reaction product which formed was removed from the reaction chamber, and washed well with water. Subsequently, that portion insoluble in water was extracted with acetone, and any acetone-insoluble material separated. The acetone extract subsequently was evaporated and a straw-colored resin secured as residue. This resin was a solid at room temperature, but molten when warmed.

*Example 4.*—An ink was prepared containing 80 parts of the resin secured as described in Example 3 and 20 parts of chrome green pigment. The ink thus prepared was solid at atmospheric temperature, but molten when warmed. On printing with this ink at 75–80° C. (167–176° F.), glossy, flexible, non-smudging prints were secured which dried instantaneously when the printed paper was removed from the press.

*Example 5.*—An ink was prepared containing 80 parts of the resin secured as described in Example 3, and 20 parts of the extended titanium dioxide pigment known as Titanox B. The ink thus prepared was solid at atmospheric temperature, but molten when warmed. On printing with this ink at 75–80° C. (167–176° F.), glossy, flexible, non-smudging prints were secured which dried instantaneously when the printed paper was removed from the press.

*Example 6.*—An ink was prepared containing 80 parts of the resin secured as described in Example 3, 17 parts of chrome green pigment, and 3 parts of paraffin wax. The ink thus prepared was solid at atmospheric temperature, but molten when warmed. On printing with this ink at 75–80° C. (167–176° F.), glossy, flexible, non-smudging prints were secured which dried instantaneously when the paper was removed from the press.

As will be seen from the foregoing description and examples, the inks of my invention comprise a thermoplastic phenolic-sulfur chloride resin as binding agent together with pigmenting material and modifying agents, if desired, and are characterized by being solid at atmospheric temperature, but molten when warmed.

It is to be understood that I do not wish to be limited to the resins described in the above examples, which are merely illustrative in character. Other phenolic compounds such as cresols, pyrocatechol, resorcinol or the like may be employed in preparation of thermoplastic phenolic-sulfur chloride resins for inks of my invention.

Also, the proportion of pigment and binding agent may be varied within wide limits to secure certain definite characteristics of flow, tack, length and gloss required for particular printing operations.

Further, the printing temperature will vary for particular compositions, though I have noted that temperatures between 75° C. (167° F.) and 95° C. (203° F.) are in general quite satisfactory for printing with inks of my invention.

I wish to emphasize again that the inks of my invention contain only materials which are solids at atmospheric temperature, and that the setting operation of my inks depends on the return of the warmed, molten phenolic-sulfur chloride resin to its cooled, solid state at atmospheric temperature.

Although the examples relate to phenol particularly, it should be understood that cresols or higher phenols may be used, if desired, in which case a lesser amount of sulfur chloride is needed. It is possible to react the phenols and cresols without a solvent being present to form the sulfur resins which are used in the present invention as resinous solidifying agents. It does not matter, in any case, if the reagent produces a light-colored resin, since the pigments are generally black or dark in color. The resins may be used in their dark form oftentimes to advantage. A resin can be used which is made by cooking phenol or cresol with sulfur and an alkali catalyst.

What I claim is:

1. A quick-setting printing ink, characterized by being solid at atmospheric temperature and molten when warm, which consists essentially of the thermoplastic reaction product of a phenol and sulphur chloride, the proportion of sulphur chloride being sufficient to render the reaction product thermoplastic, insoluble in water and soluble in acetone but not exceeding that of the phenolic hydrocarbon, and an inorganic pigment.

2. A quick-setting printing ink, characterized by being solid at atmospheric temperature and molten when warm, which consists essentially of the thermoplastic reaction product of phenol and sulphur chloride, the proportion of sulphur chloride being sufficient to render the reaction product thermoplastic, insoluble in water and soluble in acetone but not exceeding that of phenol, and an inorganic pigment.

3. A quick-setting printing ink, characterized by being solid at atmospheric temperature and molten when warm, which consists essentially of the thermoplastic reaction product of cresol and sulphur chloride, the proportion of sulphur chloride being sufficient to render the reaction product thermoplastic, insoluble in water and soluble in acetone but not exceeding that of cresol, and an inorganic pigment.

CARLETON ELLIS.